Dec. 14, 1943.  W. C. STARKEY  2,336,757
SPRING CLUTCH
Filed Dec. 3, 1942
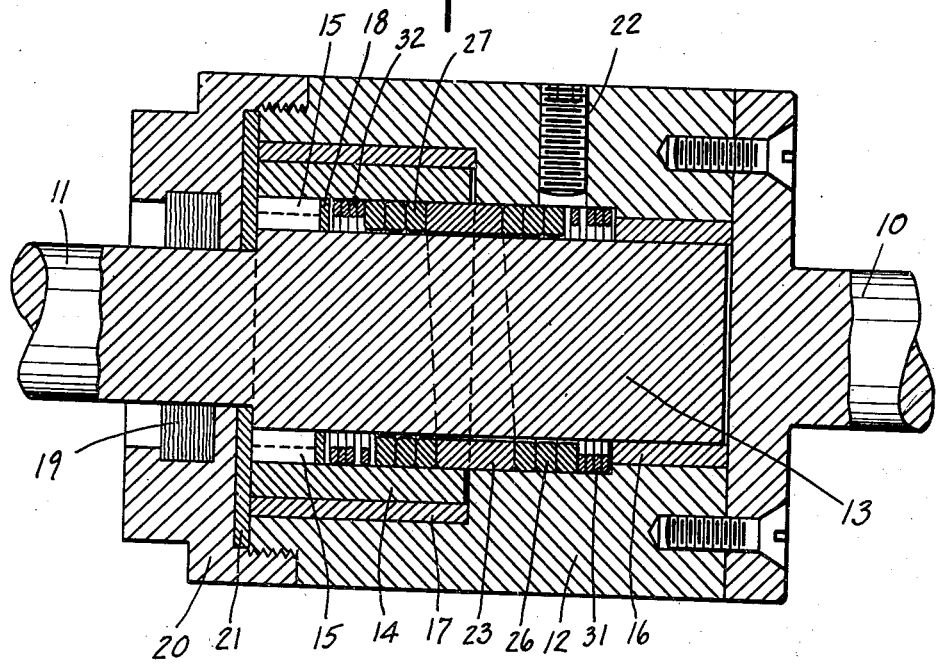
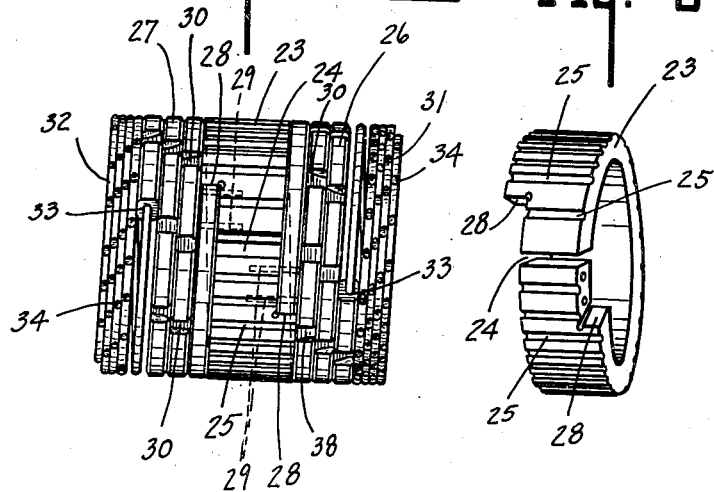
INVENTOR.
WILLIAM CARLETON STARKEY.
BY Lockwood, Goldsmith & Galt,
ATTORNEYS.

Patented Dec. 14, 1943

2,336,757

UNITED STATES PATENT OFFICE 2,336,757

SPRING CLUTCH

William Carleton Starkey, Indianapolis, Ind., assignor to L. G. S. Spring Clutches, Incorporated, Indianapolis, Ind., a corporation Application December 3, 1942, Serial No. 467,689

11 Claims. (Cl. 192—41)

This invention relates to a spring clutch of the internal expanding type for transmitting power from a driving member to a driven member for relative movement in one direction while releasing the driving member from the driven member upon relative rotation in the opposite direction, or, more particularly, to permit over running of the driven member when the driving member is at rest.

Thus, the invention particularly applies to an over running spring clutch which will permit of possible misalignments between the driving and driven members, which is particularly applicable for use wherein it may be desired to rotate the driven member independently of the driving member while permitting the driving member to take hold and drive the driven member. For example, where it may be desirable to utilize an auxiliary source of power for a driven member, it will be free to over run the auxiliary source of power and be driven by a primary source, but upon the primary source of power failing, the auxiliary driving member would take hold through the medium of the over running spring clutch.

The invention is also applicable to such use and purpose as suggested and disclosed in Letters Patent to Starkey No. 1,846,766, granted February 23, 1932, for "Starter for engines," wherein it is applied to a starting motor for internal combustion engines, the primary source being the internal combustion engine and the auxiliary or driving member being the starter motor. Similarly, it is useful in connection with an application of the spring clutch as disclosed in the Starkey Patent No. 2,030,333, granted February 11, 1936, for "Clutch spring."

Reference being had to the Starkey Patent No. 1,640,472, granted August 30, 1937, for "Spring clutch," an internal over running clutch spring has a narrow carrying coil diagonally disposed to engage the internal clutch surface of the driven and driving pockets. The maximum load transmissible from one member to the other is governed by the width and strength of the load carrying coil. It is, therefore, the purpose of this invention to improve upon the disclosure of this patent, which improvement, among other things, greatly increases the load carrying capacity of the clutch. This is accomplished by providing a relatively wide split load transmitting sleeve which straddles or overlaps the division line between the driving and driven pockets of the elements and provides a substantial bearing surface on each side thereof of such strength and frictional capacity as to greatly increase the permissible power transmitting load. Thus, the wide or broad load carrying split ring or sleeve, as distinguished from the relatively narrow coil of the spring in the above Starkey patent, is capable of transmitting a far greater load as between the driving and driven members.

Another outstanding advantage of this invention, as compared with that of the above Starkey Patent No. 1,640,472, resides in the fact that when said sleeve is expanded firmly against the inner walls of the driving and driven pockets for transmitting a torque, it insures and maintains perfect alignment between the driving and driven pockets, thus eliminating vibrational troubles, particularly in such installation where the spring clutch comprises the coupling member of two overhanging shafts having no rigid bearing supports to prevent such possible vibrational misalignment.

Other features of the invention reside in the association and connection with the load carrying split ring or sleeve, of expansible spring coils keyed to each side thereof in such manner and relation as to cause its expansion and contraction for clutching and declutching and over running action.

Another feature resides in the provision of oil scraping and retention grooves, such as to dislodge and remove oil film as between the friction surfaces to prevent slippage.

The full nature of the invention will be understood from the accompanying drawing and the following description and claims:

Fig. 1 is a central vertical section through driving and driven elements with an expanding type clutch element contained therein, of the character employed in this invention. Fig. 2 is a side elevation of the clutch element. Fig. 3 is a perspective view of the split sleeve portion of the clutch element.

In the drawing there is shown a driving shaft 10 and a driven shaft 11, the shaft 10 being connected with a suitable driving source of power of any character, and the driven shaft 11 being connected with the apparatus or mechanism to be driven. Secured to the driving shaft 10 there is provided a cylindrical driving element 12 having an internal pocket which surrounds an inner stud 13 about which it is centered, but is free to rotate. The inner stud 13 is connected to or integral with the driven shaft 11. Surrounding the stud 13 there is provided a driven element 14 in the form of a sleeve to provide a pocket of the same inner dimensions and in alignment with the pocket provided in the driving element 12. The driven element is keyed at 15 to the stud 13. The inner surfaces of the pockets provided within the elements 12 and 14 comprise the clutch surfaces of the driving and driven elements.

The elements may also embody the bushings 16 and 17, thrust washer 18, oil seal 19 and oil seal locking nut 20 provided with a thrust washer 21. There is also shown a lubricating channel and plug indicated at 22.

The spring clutch is built up of five structures as best shown in Fig. 2. Centrally of the clutch there is provided a relatively wide split ring, load carrying portion or sleeve 23 split transversely at 24 and being provided with a series of parallel transverse oil and wiping grooves 25. Said sleeve has its ends formed helically with the same degree of pitch as the spring coils on either side thereof.

On each side of the sleeve there is provided a series of heavy duty spring coils 26 and 27 comprising a building up portion of the clutch spring, their inner ends being nested within the helical cut away edges, respectively, of the sleeve 23. The inner ends of the springs 26 and 27 bear directly against the shoulders indicated at 28 due to the helical form of the sleeve and positioned on opposite sides of the split 24. Said abutting ends of the coil springs are anchored to the sleeve by the pins 29. Each coil of the springs 26 and 27 is provided with a series of spaced transverse oil and wiping grooves 30.

Connected with the outer free ends of the springs 26 and 27 there are provided the light energizing springs 31 and 32, respectively. Said energizing springs may or may not be employed in the spring clutch, depending upon the character and use to which it is put. The inner ends of said energizing springs are bent radially inwardly to extend through and interlock with a hole formed in the outer or free end of the heavy duty springs, as indicated at 33, said energizing springs similarly being provided with wiping and oil grooves 34.

The organization and assembly of the spring clutch in the driving and driven elements, as shown in Fig. 1, is such that the relatively wide split sleeve straddles or overlaps the adjacent or abutting ends of the driving and driven elements 12, 14. Thus, this sleeve is of sufficient width and strength to sustain a heavy carrying load to be imparted from the driving element to the driven element. It will be understood that in a structure of this character the load is transmitted between the elements through the spring coil which overlaps them. Thus, it is the purpose here to provide a heavy duty spring coil or load carrying portion of such width and strength as to carry the desired load. At the same time, the coil must function as a spring clutch, that is, expand and contract in and out of clutching engagement with the inner surfaces of the pockets in the manner and with the effect of the usual spring clutch, as in the above mentioned Starkey Patent No. 1,640,472.

The width of this convolute load carrying portion in the form of the split sleeve 23 is directly proportional to its load carrying strength, wherefore the load carrying requirements between the driving and driven elements may be met by proportionally increasing the width with the load carrying portion or split sleeve.

In the form herein shown, the spring clutch is universal in its action, in that it will provide an over running clutch drive from either end. Either the shaft 10 or the shaft 11 may operate as the driven member. There is no interlocking as between the spring and the driven and driving elements, since the highly flexible and light energizing springs 31, 32 have a slight frictional engagement with the inner clutch surface of their respective elements, light enough so as to permit substantially frictionless relative movement therebetween in one direction, but with sufficient frictional contact to impart a slight expanding movement to the first convolute upon rotation in the opposite direction. This slight frictional action has the effect of actually building up an expansion in the energizing springs so that as each succeeding convolute is acted upon, the frictional clutching action thereof will be increased, which, in turn, tends to unwind or expand the heavy duty convolute or building up portions 26, 27. They, in turn, expand the load carrying portion or sleeve 23 which firmly grips each adjacent inner clutch surface of the two pockets over such a wide area and throughout such a wide load carrying portion as to meet heavy duty load carrying requirements, reference being made in respect to the guilding up portions and load carrying portions of the clutch spring to the patent to Brownlee, No. 1,952,415, granted March 27, 1924, entitled "Over running clutch."

It will, therefore, be observed that by reason of the load carrying portion 23 being considerably wider than the normal width of the spring coils, and in the nature of a split sleeve acting as an expanding clutch shoe or break band, the transmission load is distributed over an appreciable area, as distinguished from its being confined to the relatively narrow width of a coil, or extending about only a portion of two convolutes thereof, as in the above-mentioned patent to Starkey No. 1,640,472.

The invention claimed is:

1. In a spring clutch, the combination of a driving element, a driven element, and a clutch spring associated with said elements and operative upon relative rotation therebetween in one direction for clutching said elements together, said spring including a pair of spaced building up portions and an intermediate load carrying portion, the load carrying portion comprising a relatively wide split sleeve having its opposite ends secured to said building up portions at points on opposite sides and adjacent the split thereof.

2. In a spring clutch, the combination of a driving element, a driven element, and a clutch spring associated with said elements and operative upon relative rotation therebetween in one direction for clutching said elements together, said spring including a pair of spaced heavy duty clutch portions having spring coils operable for expansion into clutching engagement with said elements respectively, and an intermediate split sleeve portion of substantially greater width than said coils operably connected therewith for expansion thereby into clutching engagement with both of said elements.

3. In a spring clutch, the combination of a driving element, a driven element, and a clutch spring associated with said elements and operating upon relative rotation therebetween in one direction for clutching said elements together, said spring including a clutch spring portion expansible into clutching engagement with one of said elements, a clutch spring portion expansible into engagement with the other of said elements, and an intermediate load carrying split sleeve portion of relatively greater width than the coils of said spring portions engageable with both of said elements and movable by one of said spring portions into expanded clutching position.

4. In a spring clutch, the combination of a driving element, a driven element, and a clutch spring associated with said elements and operating upon relative rotation therebetween in one direction for clutching said elements together, each of said elements including a cylindrical pocket with said pockets opposed and provided with axially aligned inner clutch surfaces abutting each other, said spring including a building up portion within and engageable with each of said pockets respectively, and an intermediate load carrying portion expansible through the action of one of said building up portions, said load carrying portion comprising a relatively wide split sleeve spanning the abutting ends of said pockets for internal clutching engagement with both of said pockets to transmit the driving load therebetween.

5. In a spring clutch, the combination of a driving element, a driven element, and a clutch spring associated with said elements and operative to transmit a driving load from one element to the other while permitting free over run of the driven element, said elements including oppositely disposed axially aligned pockets having contiguous inner clutching surfaces, said spring including a split sleeve portion expansible into simultaneous clutching engagement with both of said surfaces, and an expanding portion comprising a coil spring operably connected with said split sleeve portion for expanding it into clutching engagement upon said expanding portion being expanded by operative rotation of the driving member.

6. In a spring clutch, the combination of a recessed driving element and an oppositely disposed correspondingly recessed driven element having contiguous inner clutching surfaces, an expansible clutch sleeve, extending into both of said elements in position to simultaneously and correspondingly engage and clutch their contiguous surfaces and disengage said surfaces upon contraction thereof, and a clutch spring in one of said recessed elements operably connected with said expanding clutch sleeve adapted to effect the clutching expansion thereof upon its expansion into clutching engagement by rotation of said element in a direction to exert an unwinding action thereon.

7. In a spring clutch, the combination of a driving element and a driven element, said elements being provided with oppositely disposed axially aligned cylindrical pockets forming contiguous internal clutch surfaces, a clutch spring associated with said elements and operating upon relative rotation therebetween in one direction for clutching said elements together and declutching said elements upon relative rotation in the opposite direction, said spring including a load carrying portion comprising a relatively wide split sleeve extending into both of said pockets for simultaneous clutching engagement therewith, one end of said sleeve being convolute in form to provide a shoulder, and a clutch spring portion carried in one of said pockets having its coils corresponding in width to said shoulder with one end thereof abutting and secured thereto and one coil of said spring conforming to and lying against the end of said sleeve, said spring portion being operable upon rotation of the driving element in one direction to expand into clutching engagement and rotation therewith to effect the expansion of said sleeve into simultaneous clutching engagement with the clutch surfaces of both of said elements to thereby impart corresponding rotation to said driven element.

8. In combination with a driving shaft and a driven shaft extending in axial alignment therewith, said shafts having abutting cylindrical pockets to provide contiguous inner clutch surfaces, a split sleeve of substantial width common to both pockets and extending therein for gripping relation with the clutch surfaces thereof, but normally free from clutching engagement, and means operable upon relative rotation between said shafts in one direction to expand said sleeve into clutching engagement with said pockets for transmitting torque from one to the other and maintain them in driving alignment.

9. In a spring clutch, the combination of a driving element and a driven element, a clutch spring associated with said elements and operable upon relative rotation therebetween in one direction to clutch said elements together, said elements extending in axial alignment and being provided with opposed and abutting cylindrical clutch surfaces, said spring including a building up portion engageable with one of said clutch surfaces, and a load carrying portion movable through the action of said building up portion to simultaneously clutch the surfaces of both elements, said load carrying portion comprising a relatively wide split sleeve spanning the ends of said elements for clutching engagement with a substantial portion of the clutch surfaces thereof to transmit a driving load therebetween.

10. In a spring clutch, the combination of a driving shaft and a driven shaft extending in axial alignment therewith, said shafts being provided with contiguous clutch surfaces, a split sleeve of substantial width common to a substantial portion of both surfaces for clutching engagement therewith, and a clutch spring movable to clutching engagement with one of said clutch surfaces having one end in operative engagement with said sleeve and the other end in operative engagement with said last-mentioned clutch surface for forcing said sleeve into clutching engagement with said surfaces upon said spring being moved to clutching engagement.

11. The combination of a driving element, a driven element, and a clutch member associated with said elements operative upon relative rotation therebetween in one direction for clutching said elements together, said member including a load carrying portion comprising a relatively wide expansible and contractible sleeve movable into and out of clutching engagement with a substantial portion of said elements, and a building up portion comprising a series of expansible and contractible spring coils having one end operatively connected with said sleeve and the other end in operative engagement with said driving element.

WILLIAM CARLETON STARKEY.